United States Patent
Stiles (10) Patent No.: US 9,145,828 B1
(45) Date of Patent: Sep. 29, 2015

(54) LOW FRICTION TURBINE ENGINE

(71) Applicant: Walter Stiles, Pompano Beach, FL (US)

(72) Inventor: Walter Stiles, Pompano Beach, FL (US)

(*) Notice: Subject to any disclaimer, the term of this patent is extended or adjusted under 35 U.S.C. 154(b) by 0 days.

(21) Appl. No.: 14/268,857

(22) Filed: May 2, 2014

(51) Int. Cl.
  *F02B 53/04* (2006.01)
  *F02B 53/10* (2006.01)
  *F01C 1/08* (2006.01)

(52) U.S. Cl.
  CPC . *F02B 53/10* (2013.01); *F01C 1/08* (2013.01); *Y02T 10/17* (2013.01)

(58) Field of Classification Search
  CPC ........ F02B 53/00; F02B 2730/05; F01C 1/08; F01C 1/082; Y02T 10/17
  USPC ......... 123/238, 209, 229, 232, 246, 249, 205, 123/228, 231, 241; 418/196, 191, 199, 205, 418/137, 195, 200, 37
  See application file for complete search history.

(56) References Cited

U.S. PATENT DOCUMENTS

| | | | | | |
|---|---|---|---|---|---|
| 2,088,121 | A | * | 7/1937 | Swink | 123/232 |
| 2,719,513 | A | * | 10/1955 | Dezell | 123/238 |
| 3,354,871 | A | * | 11/1967 | Gibson | 123/229 |
| 3,577,960 | A | * | 5/1971 | Wiley | 123/209 |
| 4,470,779 | A | * | 9/1984 | Whitehouse | 418/111 |
| 5,595,154 | A | * | 1/1997 | Smith | 123/222 |
| 6,341,590 | B1 | * | 1/2002 | Barrera et al. | 123/245 |
| 2009/0142211 | A1 | * | 6/2009 | Holden et al. | 418/1 |

* cited by examiner

*Primary Examiner* — Mary A Davis
*Assistant Examiner* — Jason T Newton
(74) *Attorney, Agent, or Firm* — Oltman, Flynn & Kubler; Frank L. Kubler (57) ABSTRACT

An internal combustion engine in the form of a frictionless turbine includes a piston and a combustion chamber with a combustion chamber wall, which is frictionless because it has no piston rings so that the pistons do not touch the combustion chamber wall. There is clearance between the piston and the chamber wall, so that no piston lubrication is provided or needed, and the absence of friction between the piston and chamber wall permits the turbine to reach very high speeds. Computer control preferably is provided to meter fuel into the combustion chamber as turbine revolutions per minute increase from starting speed to full speed to maximize engine smoothness of operation and efficiency.

7 Claims, 11 Drawing Sheets

LOW FRICTION TURBINE ENGINE

FILING HISTORY

This application continues from provisional patent application Ser. No. 61/819,443 filed on May 3, 2013.

BACKGROUND OF THE INVENTION

Field of the Invention

The present invention relates generally to the field of engines. More specifically the present invention relates to an internal combustion engine in the form of a frictionless turbine includes a piston and a combustion chamber with a combustion chamber wall, which is frictionless because it has no piston rings so that the pistons do not touch the combustion chamber wall. There is clearance between the piston and the chamber wall, so that no piston lubrication is provided or needed, and the absence of friction between the piston and chamber wall permits the turbine to reach very high speeds. Computer control preferably is provided to meter fuel into the combustion chamber as turbine revolutions per minute increase from starting speed to full speed to maximize engine smoothness of operation and efficiency.

SUMMARY OF THE INVENTION

The present invention accomplishes the above-stated objectives, as well as others, as may be determined by a fair reading and interpretation of the entire specification.

The present invention is a frictionless turbine engine. The engine includes a piston and a combustion chamber with a combustion chamber wall, which is frictionless because it has no piston rings so that the pistons do not touch the combustion chamber wall. There is clearance between the piston and the chamber wall, so that no piston lubrication is provided or needed, and the absence of friction between the piston and chamber wall permits the turbine to reach very high speeds. Computer control preferably is provided to meter fuel into the combustion chamber as turbine revolutions per minute increase from starting speed to full speed to maximize engine smoothness of operation and efficiency.

Preferably, the engine of the present invention has a housing with a cylindrical main or central chamber and small r cylindrical outer chambers intersecting the main or central Chamber at circumferentially spaced locations and extending parallel to it. A main or central rotor in the main or central chamber has a continuous circumferential groove. Vanes at circumferentially spaced locations on the main rotor block its circumferential groove and extend out to the inside of the central chamber.

An outer rotor in each outer chamber has a pair of lobes with peripheral surfaces that have a clearance fit with the inside of that outer chamber and a clearance fit in the circumferential groove in the main rotor. Between these lobes each outer rotor has peripheral recesses which receive the vanes on the main rotor when the main rotor rotates in one direction and the outer rotor rotates in the opposite direction. The surface speed of each outer rotor at its lobes is equal to the surface speed of the main rotor at the bottom of its circumferential groove, so that there is no contact between the main rotor and each outer rotor. Each outer rotor controls the outer rotor controls the communication between a respective air intake port and the circumferential groove in the main rotor, with each lobe on an outer rotor blocking such communication and each peripheral recess in an outer rotor providing such communication at different times during each rotation of the outer rotor. Exhaust ports communicate at all times with the circumferential groove in the main rotor.

It is a principal object of this invention to provide such a frictionless turbine or rotary internal combustion engine having a piston and a combustion chamber having a combustion chamber wall, in which this engine is frictionless because it has no piston rings so that the pistons do not touch the combustion chamber wall, but rather there is clearance between the piston and the chamber wall. As a result of the absence of contact between the piston and the combustion chamber wall, there is no piston lubrication, since none is needed, and the frictionless design permits the turbine to reach very high speeds which would not be possible otherwise.

It is another object of the present invention to provide such an internal combustion engine which has computer control to meter fuel into the combustion chamber as turbine revolutions per minute (rpm's) increase from starting speed, particularly if the starting speed is low, to full speed. Computer control maximizes engine smoothness of operation and efficiency.

A still another object of this invention is to provide such an internal combustion engine having a novel and advantageous mode of operation.

It is finally an object of the present invention to provide such a rotary internal combustion engine of novel construction which makes feasible the close manufacturing tolerances required for its successful operation.

Other objects and advantages of this invention will be apparent from the following detailed description of a presently preferred embodiment which is illustrated schematically in the accompanying drawings.

BRIEF DESCRIPTION OF THE DRAWINGS

Various other objects, advantages, and features of the invention will become apparent to those skilled in the art from the following discussion taken in conjunction with the following drawings, in which.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-14, a turbine engine is disclosed having a piston and a combustion chamber with a chamber wall which is frictionless because it has no piston rings so that the pistons do not touch the combustion chamber wall. Instead, there is clearance between the piston and the chamber wall, which preferably is a distance of $6/6000$ inch. This particular clearance measurement is however only exemplary and other clearance measurements are contemplated. As a result of the absence of contact between the piston and the combustion chamber wall, there is no piston lubrication, since none is needed. This frictionless design permits the turbine to reach very high speeds which would not be possible otherwise. Computer control preferably is provided to meter fuel into the combustion chamber as turbine revolutions per minute (rpm's) increase from starting speed, particularly if the starting speed is low, to full speed. Computer control maximizes engine smoothness of operation and efficiency.

Figure 4:
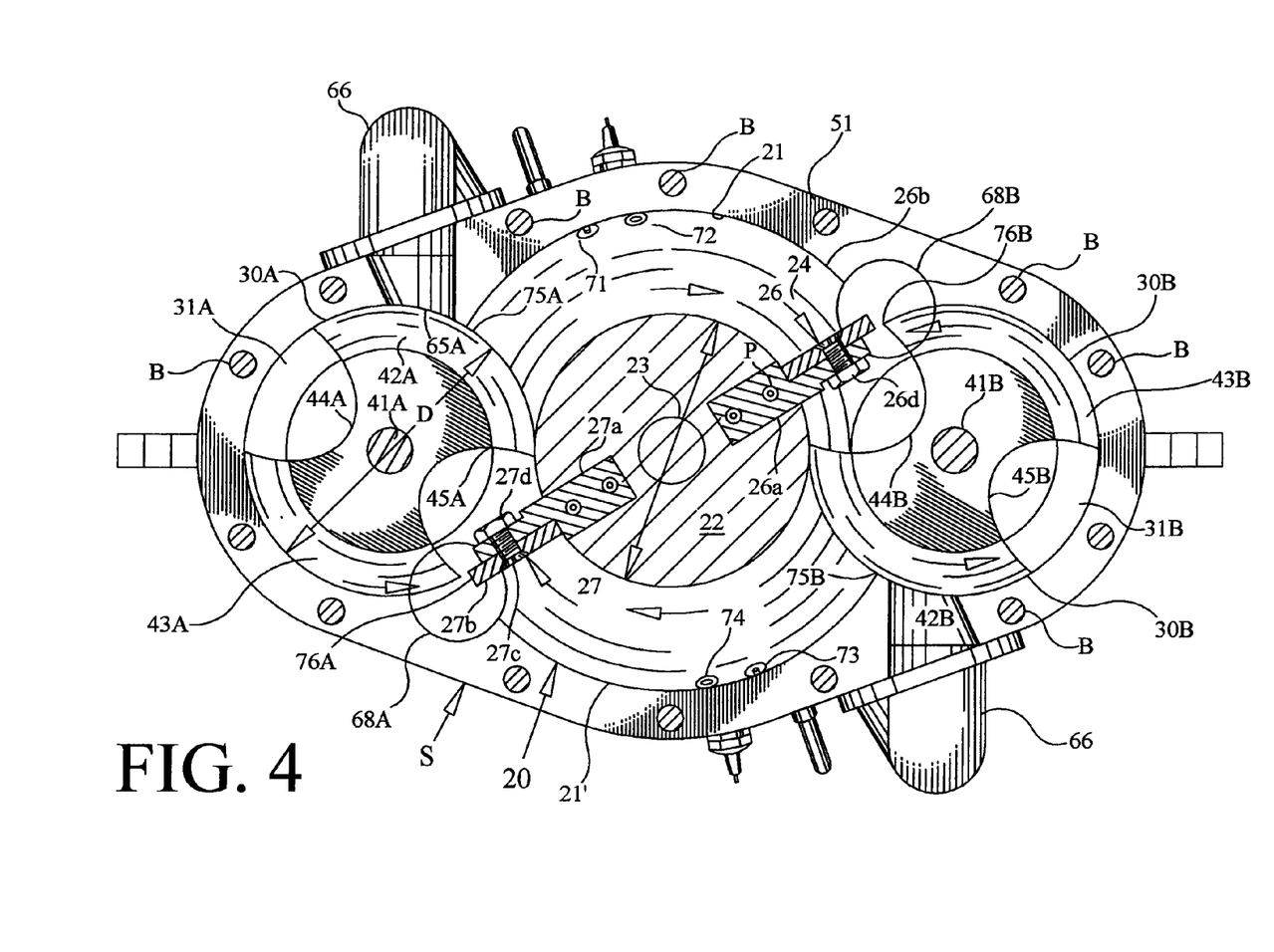
FIG. 4 is a vertical cross-section taken along the line 4-4 in FIG. 3.

Referring to FIG. 4, the internal combustion turbine engine in accordance with the present invention shown there comprises a stator or housing S having a generally cylindrical central or main chamber 20 intersected on opposite sides by generally cylindrical smaller diameter outer chambers 30A and 30B, which are the same size as each other.

The respective axes of chambers 20, 30A and 30B extend parallel to one another. Except at the intersection of its central chamber 20 with the other chambers 30A and 30B, the housing has a circumferential groove on the inside extending across the top and bottom of central chamber 20. In FIG. 4, this is shown as the upper and lower arcuate grooves 21 and 21' which extend respectively above and below its intersections with the outer chambers 30A and 30B.

Figure 7:
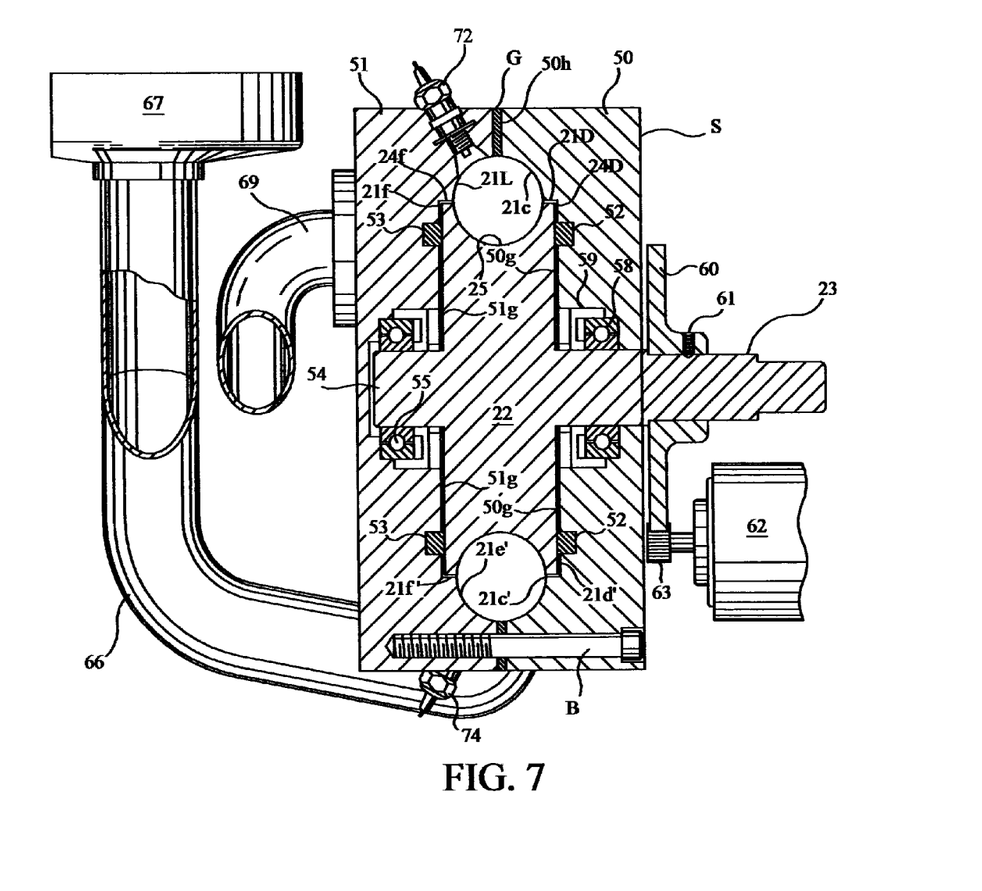
FIG. 7 is a cross-section taken along the line 7-7 in FIG. 6 through the central chamber of the engine.
Figure 8:
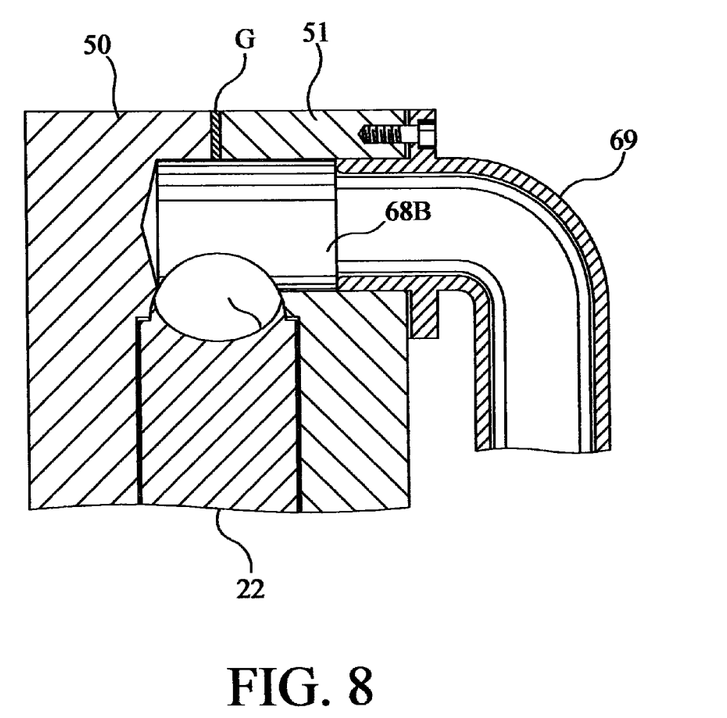
FIG. 8 is a fragmentary cross-section taken along the line 8-8 in FIG. 6 at one of the exhaust ports of the engine.
Figure 9:
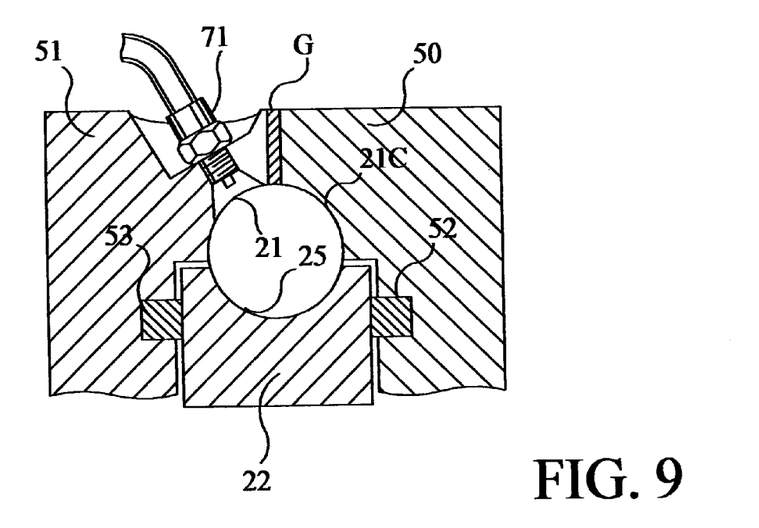
FIG. 9 is a fragmentary cross-section taken along the line 9-9 in FIG. 6 at one of the air intake ports.

Referring to FIG. 7, the stator or housings has opposite pieces 50 and 51, which are mirror images of each other, and a sealing gasket 72 clamped between them by bolts. Housing piece 50 has a flat, vertical, inner end face extending in from its periphery and engaging the gasket on one side. Similarly, the other housing piece 51 has a flat, vertical, inner end face 51h extending in from its periphery and engaging the Gasket 5 3" on the opposite side.

The upper groove 21 at the main or central chamber 20 is defined by a concave surface 21c of arcuate cross-section on the inside of housing piece 50, a similar concave surface 21e on the inside of the opposite housing piece 51, and the inside edge of gasket 52'. Groove 21 is semi-circular in cross-section and it extends 118 degrees arcuately along the top of central chamber 20. At the edge of its concave surface 21c away from gasket 52 the housing piece 50 has a narrow, cylindrical, inside surface 21d which extends in to a flat, vertical, inner end face 50g of this housing piece.

Similarly, at the edge of its concave surface 21e away from gasket 52, the other housing piece 51 has a narrow, cylindrical, inside surface 21f which extends in to a flat, vertical, inner end face 51g of this housing piece.

The lower groove 21' at the central chamber 20 is a mirror image of the upper groove 21. It is defined by concave surfaces 21c' and 21e' on the inside of housing pieces 50 and 51, respectively, and the inside edge of gasket.

Narrow, cylindrical, inside surfaces 21d' and 21f' of the housing pieces extend from the respective concave surfaces 21c' and 21e' to the flat inner end faces 50g and 51g of the respective housing pieces.

Housing piece 50 carries a sealing ring 52 on the inside that projects slightly past its inner end face 51g on one side of its central chamber 20. This ring is seated in a groove in housing piece 50 located a short distance radially inward from its narrow, cylindrical, upper and lower inside surfaces 21d and 21d'. Similarly, the other housing piece carries a sealing ring 53 that is seated in a groove located a short distance radially inward from its narrow, cylindrical, upper and lower inside surfaces 21f and 21f'. Ring 53 projects a slight distance past the inner end face 51g of housing piece 51.

A main or central rotor 22 is positioned concentrically inside the central chamber 20 on a rotatable shaft 23.

As shown in FIG. 7, rotor 22 has cylindrical outer surfaces 24d and 24f extending in from its opposite end faces and having a slight clearance from the cylindrically extending upper and lower inside surfaces 21d, 21d', 21f and 21f' on the inside of housing pieces 50 and 51. Rotor 22 also has a continuous circumferential groove 25 of semi-circular cross-section between its cylindrical outer surfaces 24d and 24f.

The radius of this circumferential groove 25 in the main rotor is just slightly less than the radius of each concave surface 21c, 21e, 21 c' and 21e' on the inside of housing pieces 50 and 51. The opposite end faces of rotor 22 slidably engage the sealing rings 52 and 53 carried by housing pieces 50 and 51. At the bottom of its groove 25, rotor 22 has a diameter D (FIG. 4) smaller than its diameter at its outer surfaces 24d and 24f. The arcuate inside surfaces 21c and 21e of housing pieces 50 and 51, the inside edge of gasket an upper space of substantially circular cross-section between the housing S and the main rotor 22.

This upper space is a segment of a toroid. The outer half of this toroidal segment space is defined by the arcuate inside surfaces 21c and 21e of housing pieces 50 and 51 and the inside edge of gasket 52; its inner half is defined by the circumferential groove 25 in the main rotor 22. Likewise, the arcuate inside surfaces 21d' and 21f' of housing pieces 50 and 51, the inside edge of gasket 52, and the adjacent part of the circumferential groove 25 in rotor 22 define a lower space of substantially circular cross-section which is a segment of the same toroid in the central chamber 20.

Figure 3:
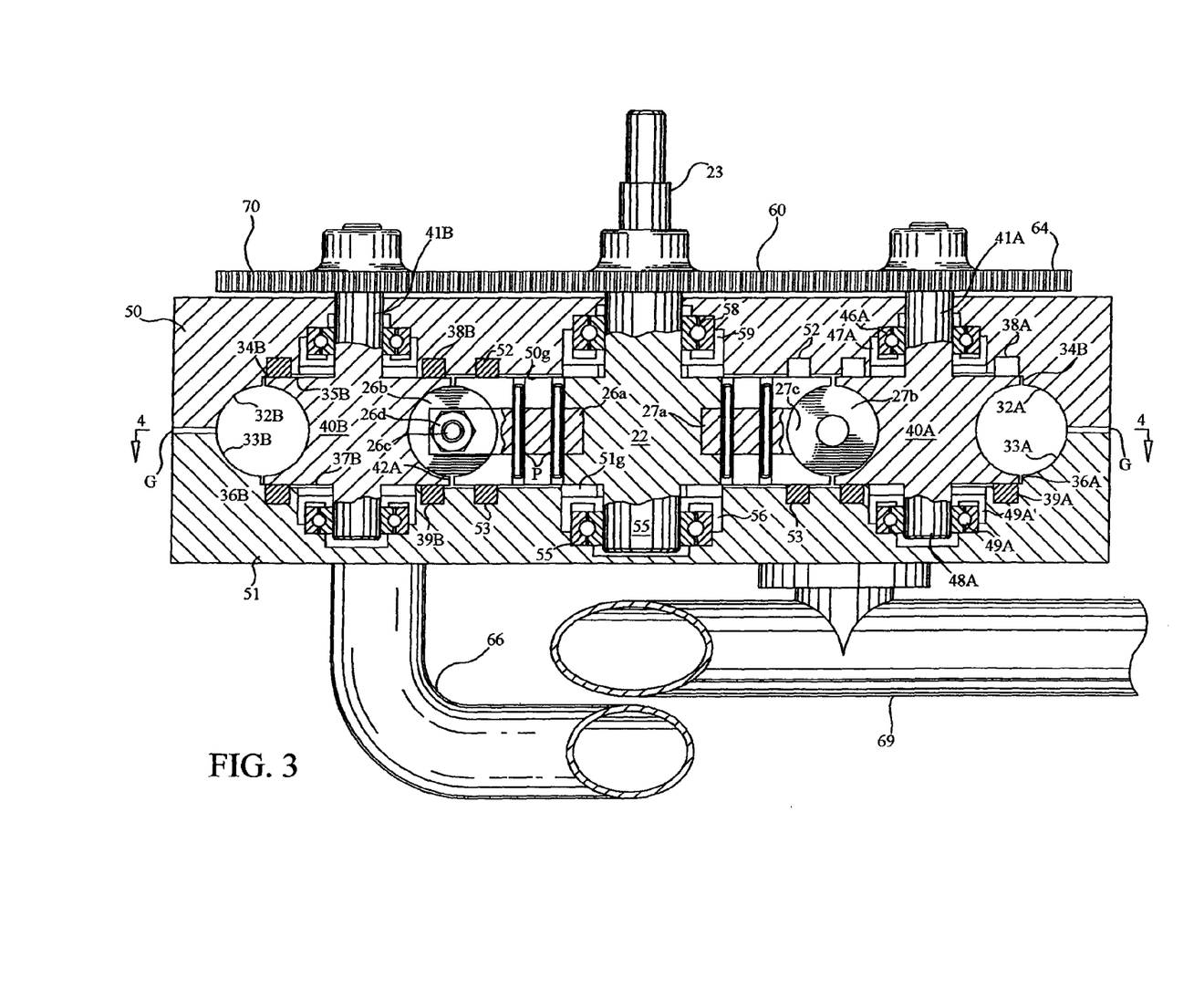
FIG. 3 is a horizontal longitudinal section taken along the line 3-3 in FIG. 2.

Two vanes 26 and 27 (FIG. 4) are rigidly attached to the main rotor 22 and they extend out from it and have a clearance fit in the just-mentioned upper and lower toroidal segment spaces between the main rotor and the inside of the housing at the central chamber 20. Referring to FIGS. 3 and 4, vane 26 has an inner piece 26a fastened in rotor 22 by pins P and a flat circular outer piece 26b fastened to the inner piece 26a by a bolt 26c and a nut 26d.

The radius of the outer piece 26b of vane 26 is the same as the radius of the circumferential groove 25 in main rotor 22 and it completely blocks this groove. The radius of the outer piece 26b of vane 26 is just slightly less than the radius of the arcuate inside surfaces 21c and 21e, or 21c' and 21e', on housing pieces 50 and 51 so that it can slide along these surfaces and provide a substantially gas-tight seal.

The main rotor 22 has a cylindrical stub shaft 54 on one side (FIGS. 3 and 7) which is rotatably supported by a ball bearing 55 held in the housing piece 51 by an annular seal 56. On the opposite side, rotor 22 is joined to shaft 23, which extends out through the opposite piece 50 of the housing. A ball bearing 58, which is protected by an annular seal 59, rotatably supports shaft 23.

A gear 60 is attached to the main rotor shaft 23 by a set screw 61. Gear 60 is located close to the outside face of Housing piece 50. A starter motor 62 drives a small diameter spur gear 63 that is engageable with gear 60 to start the engine. The pitch diameter of gear 60 is equal to the diameter of the main rotor 22 at the bottom of its circumferential groove 25.

Figure 5:
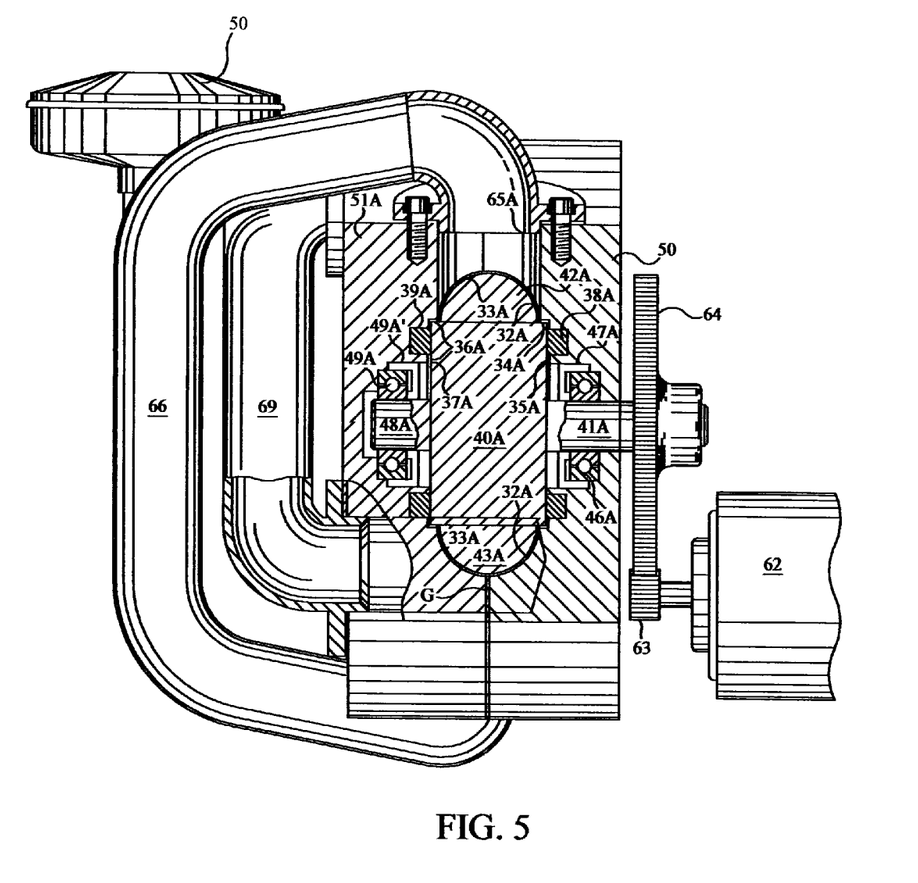
FIG. 5 is a vertical cross-section taken along the line 5-5 in FIG. 1 through one of the outer chambers of the engine.
Figure 6:
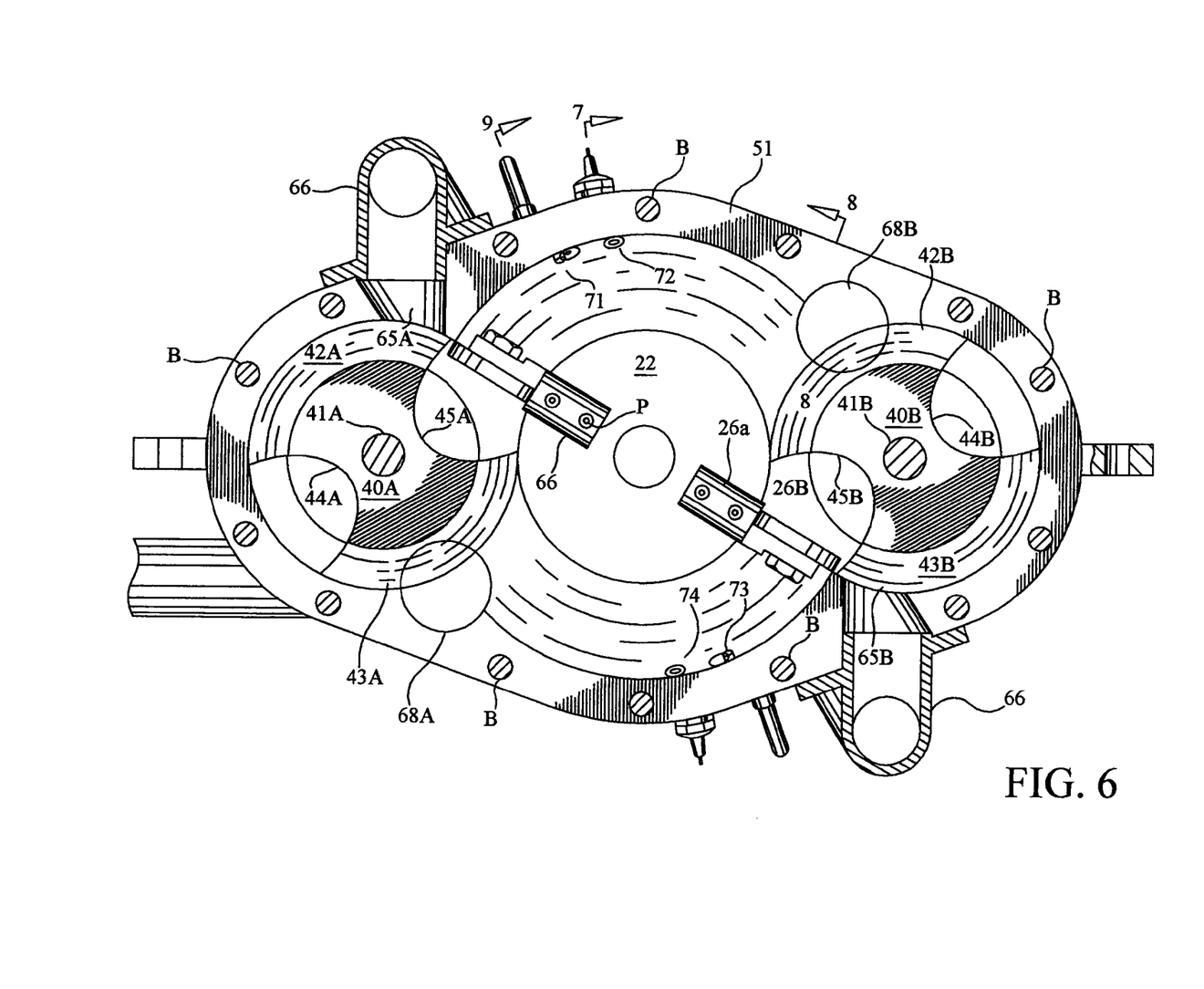
FIG. 6 is a view like FIG. 4 and showing the position of the parts at a different time during the operating cycle of the engine.

Referring to FIG. 4, the outer chamber 30A on the left side intersects the central chamber 20 over substantially 112 degrees of the circumferential extent of chamber 30A and over substantially 62 degrees of the circumferential extent of chamber 20. Except at this intersection, chamber 30A has a circumferential groove 31A. As shown in FIG. 5, this groove is defined by a concave surface 32A of arcuate cross-section on the inside of housing piece 50, a similar concave surface 33A on the inside of the opposite housing piece 51, and the inside edge of gasket 52. The groove is semi-circular in cross-section and it extends arcuately along the inside of the housing for substantially 248 degrees.

At the edge of its concave surface 32A away from gasket, the housing piece 50 has a narrow cylindrical inside surface 34A which extends in to a flat, vertical, inner end face 35A. Similarly, at the edge of its concave surface 33A away from gasket 5Q, the other housing piece 51 has a narrow, cylindrical inside surface 36A which extends into a flat, vertical, inner end face 37A. Housing piece 50 carries a sealing ring 38A which projects slightly past its inner end face 35A.

Housing piece 51 carries a sealing ring 39A which projects slightly past its inner end face 37A.

An outer rotor 40A on a rotatable shaft 41A is positioned concentrically inside the outer chamber 30A.

Rotor 40A has flat opposite end faces that slide across the sealing rings 38A and 39A. Rotor 40A has two peripheral lobes 42A and 43A (FIG. 4) located diametrically opposite one another and separated by generally U-shaped, deep recesses 44A and 45A. Each lobe 42A and 43A, extends substantially 125 degrees and each peripheral recess 44A and 45A extends substantially 65 degrees circumferentially of the rotor 40A on its periphery. As shown in FIG. 5, each lobe 42A and 43A, is semicircular in cross-section (i.e., radially of the rotor 40A) and it has a close clearance fit in the circumferential groove 31 of outer chamber 30A. On opposite sides of each lobe 42A and 43A the outer rotor 40A has narrow cylindrical surfaces that have a close clearance fit with the cylindrical inner surfaces 34A and 36A of housing pieces 50 and 51.

At each peripheral lobe 42A and 43A, the outer rotor 40A has a diameter D (FIGS. 4 and 5) that is the same as the diameter of the main rotor 22 at the bottom of its peripheral groove 25. The axes of main rotor 22 and outer rotor 40A are just slightly more than 2D apart so that each lobe 42A and 43A on the outer rotor has a close clearance fit in the circumferential groove 25 in main rotor 22.

Each recess 44A and 45A in outer rotor 40A has an arcuate bottom face that merges smoothly at its opposite ends with flat faces that diverge slightly from each other outward from the axis of this rotor. The configuration of recess 45A in outer rotor 40A is such that vane 27 on main rotor 22 has a substantial clearance in this recess when the main rotor rotates in one direction and outer rotor 40A rotates in the opposite direction.

Similarly, vane 26 on main rotor 22 has a substantial clearance in the other peripheral recess 44A in outer rotor 40A when the two rotors rotate in opposite directions.

The shaft 41A of outer rotor 40A is rotatably supported by a ball bearing 46 (FIG. 5) held in the housing piece 50 and covered by an annular seal 47. A stub shaft 48 on the opposite side of rotor 40a is rotatably supported by a ball bearing 49 held in the housing piece 51 and covered by a similar seal 49'.

On the outside of housing piece 50 the outer rotor shaft 41A carries a gear 64 that meshes with the gear 60 on the shaft 23 of main rotor 22. Gear 64 has a pitch diameter equal to the diameter of outer rotor 22 at its lobes 42A and 43A, which is the same as the diameter of main rotor 22 at the bottom of its circumferential recess, which is the same as the pitch diameter of gear 60 on the main rotor.

Figure 10:
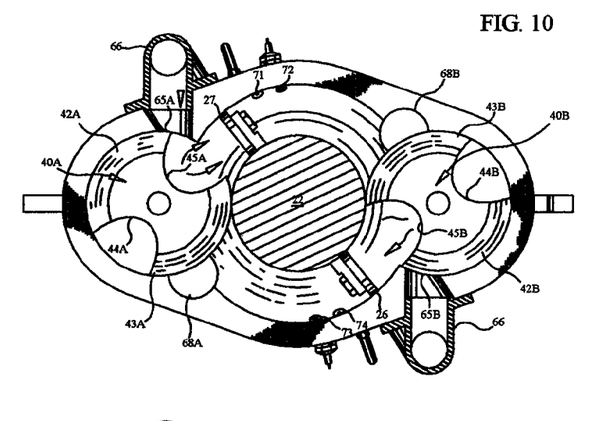
FIG. 10 is a view like FIGS. 4 and 6 showing the position of the parts during the air intake stage of the engine's operation.
Figure 11:
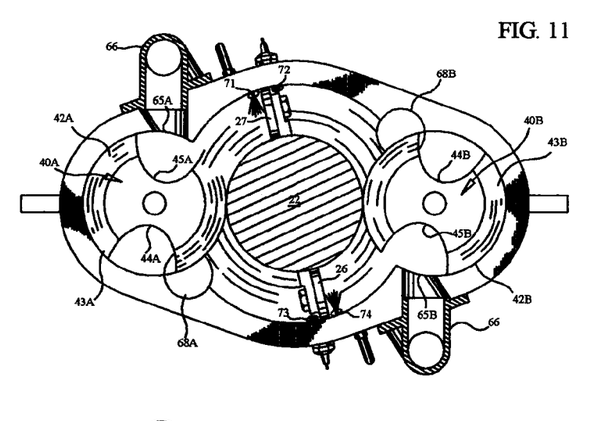
FIG. 11 is a similar view during the fuel injection stage.
Figure 12:
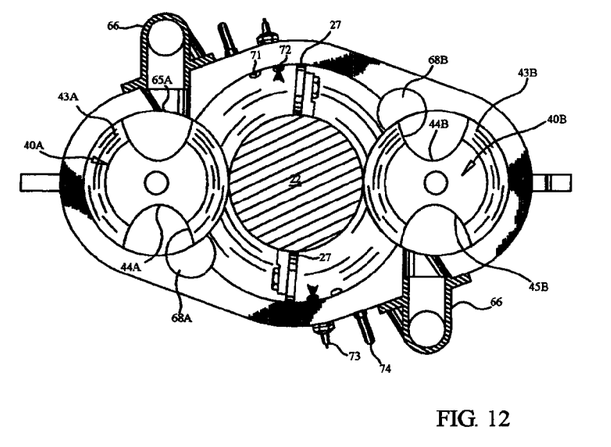
FIG. 12 is a similar view during the spark plug firing stage.
Figure 13:
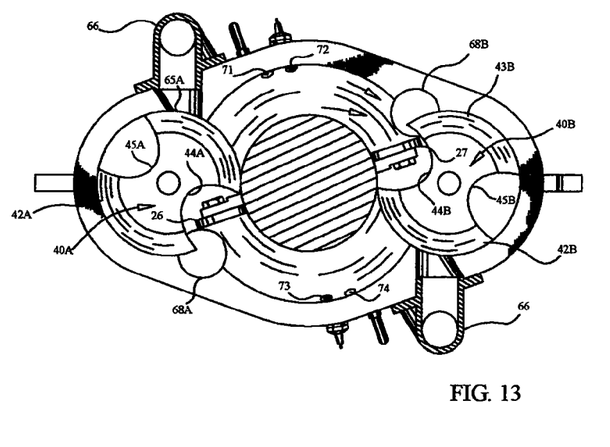
FIG. 13 is a similar view during the exhaust stage.
Figure 14:
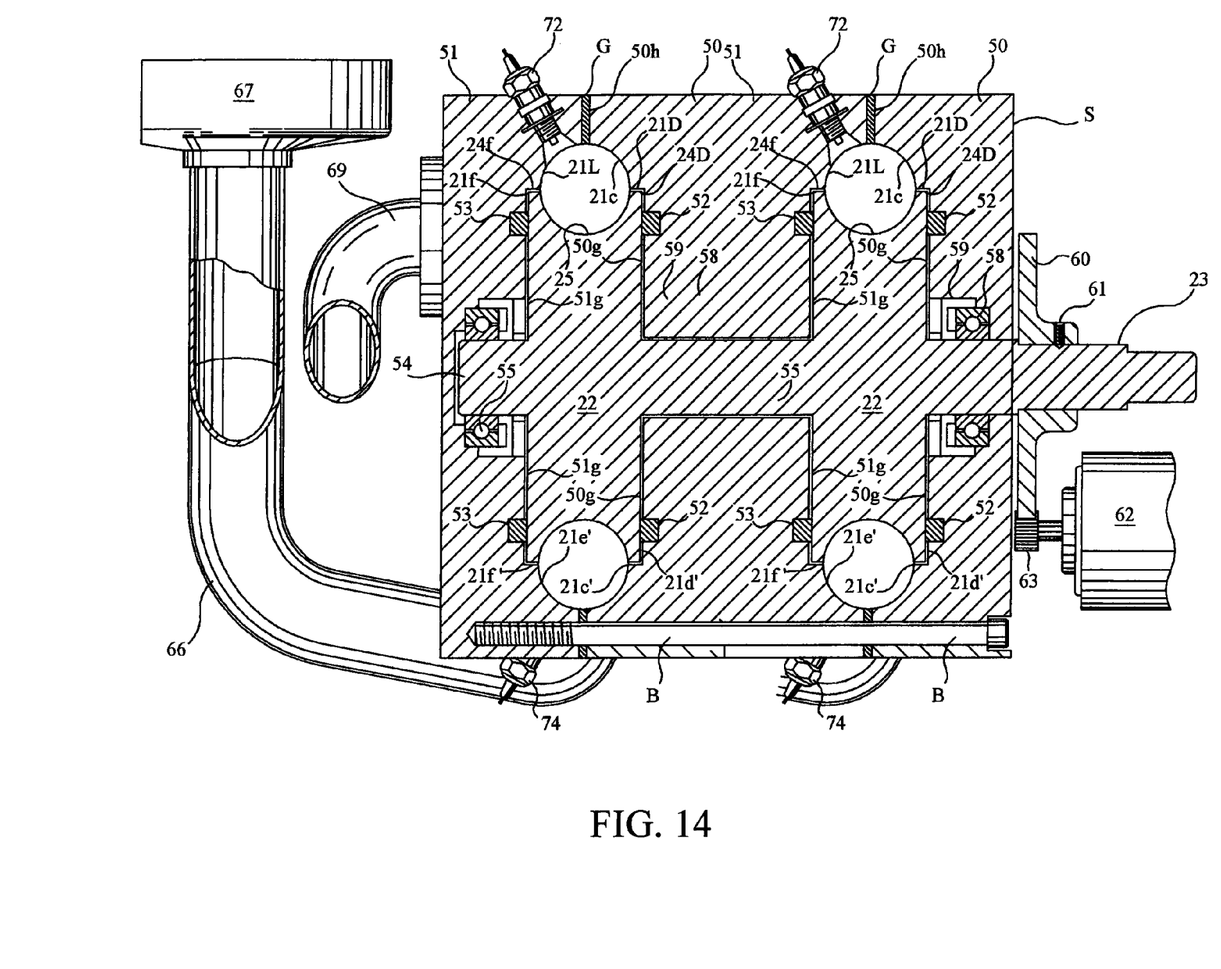
FIG. 14 is a cross-sectional side view of two stacked frictionless turbine engines or engine rotors having a common cylindrical stub shaft.

Outer chamber 30A has an air intake port 65A at the top which opens into the space 31A when either peripheral recess 44A or 45A in outer rotor 40A registers with this port. As shown in FIGS. 10, 11 and 12, recess 44A is wide enough circumferentially of the outer rotor 30A to connect the air intake port 65A to the circumferential groove 25 in main rotor 22 throughout an interval during each rotation of rotors 22 and 30A in opposite directions. This is also true of the other peripheral recess 44A in outer rotor 30A. Each lobe 42A and 43A on outer rotor 40A blocks the air intake port 65A at different intervals during each rotation of this outer rotor.

The air intake port 65A is connected to an air intake manifold 66 outside the engine housing S. This air intake manifold is connected to an air cleaner 67 (FIG. 2) which passes ambient air into the air intake manifold. The housing S has an inside corner 75A at the intersection between its central chamber 20 and outer chamber 30A near the air intake port 65A.

Outer chamber 30A has an exhaust port 68A near the bottom which partially overlaps the central chamber 20 and the outer chamber 30A where they intersect. Exhaust port 68A is blocked partially but not completely by each lobe 42A and 43A on the outer rotor 40A at different intervals during each rotation of this rotor. Exhaust port 68A is always open to the central chamber 20 of the engine. Exhaust port 68A is connected to an exhaust manifold 69 (FIG. 2) outside the engine. The housing S has a sharp inside corner 76A at the intersection between its central chamber 20 and the outer chamber 30A near the exhaust port 68A.

On the opposite side of the central chamber 20, the smaller chamber 30B and the rotor 40B inside it are mirror images of outer chamber 30A and rotor 40A. Corresponding elements on this side are given the same reference numerals, with a B suffix instead of an A suffix, as those already described and the detailed description of these elements will not be repeated.

The shaft 41B of the outer rotor 40B carries a gear 70 on the outside of housing piece 50 that meshes with the gear 60 on the main rotor shaft 23. Gear 70 has the same pitch diameter as gear 60.

Referring to FIG. 4, a first fuel injector 71 is positioned to discharge fuel into the central chamber 20 above the main rotor 22 and a first spark plug 72 is positioned a short distance clockwise from fuel injector 71 to ignite the fuel/air mixture above the main rotor. A second fuel injector 73 is positioned to discharge fuel into the central chamber 20 below the main rotor 22 and a second spark plug is positioned a short distance clockwise from fuel injector 73 to ignite the fuel/air mixture below the main rotor.

The vanes 26 and 27 on the main rotor co-act with the upper and lower grooves 21 and 21' in the central chamber 20 and the peripheral recesses 44A,45A and 44B,45B in the two outer rotors 40A and 40B to provide two combustion chambers in the engine, one above and the other below the main rotor 22.

Operation

Because of the arrangement of the equal-sized gears 60, 64 and 70 and the respective rotors 22,40A and 40B, when the main gear 22 rotates in one direction, the outer gears 40A and 40B rotate in the opposite direction and the surface speed of each outer gear 40A and 40B on the outside of its lobes 42A and 43A, or 42B and 43B, is equal to the surface speed of the main gear 22 at the bottom of its circumferential groove 25.

Starting with the rotors 22, 40A and 40B in the rotational positions shown in FIG. 4, with the main or central rotor 22 rotating clockwise and the outer rotors 40A and 40B counter-clockwise, and with the surface speed of each outer rotor at the outer-most point of each lobe 42A or 43A, or 42B or 42B, equal to the surface speed of the main rotor 22 at the bottom of its peripheral groove 25, the vane 27 on the main rotor begins to move into the peripheral recess 45A in outer rotor 40A and the vane 26 on the main rotor begins to move into the peripheral recess 44B in outer rotor 40B. In this position of the parts, lobe 42A on outer rotor 40A blocks the air intake port 65A, and lobe 42B on outer rotor 40B blocks the air intake port 65B.

About 62 degrees past the rotational position shown in FIG. 4, the outer rotor 40A begins to uncover the upper air intake port 65A and the outer rotor 40B begins to uncover the lower air intake port 65B. These ports are not completely covered again until the respective outer rotors have rotated about 95 degrees past the FIG. 4 position.

Vane 27 moves up past the inside corner 75A near the upper air intake port 65A at about 65 degrees of the rotation of the main rotor 22 past the FIG. 4 position. The same is true of vane 26 in its movement down past the inside corner 75B near the lower air intake port 65B. After moving completely past the respective air intake ports, as shown in FIG. 10, the vanes 26 and 27 create a partial vacuum to draw air into the respective spaces 21 and 21' inside the central cylinder 20 above and below the main rotor 22 at its circumferential groove 25.

The vanes then move past the respective fuel injectors F and F' (FIG. 11) and later past the respective spark plugs P and P' (FIG. 12). When the spark plugs are fired, the explosions of the fuel-air mixture behind the vanes 27 and 26 pushes the central rotor 22 clockwise past the respective exhaust ports 68B and 68A, which pass the products of combustion out of the respective combustion chambers between the vanes.

Figure 1:
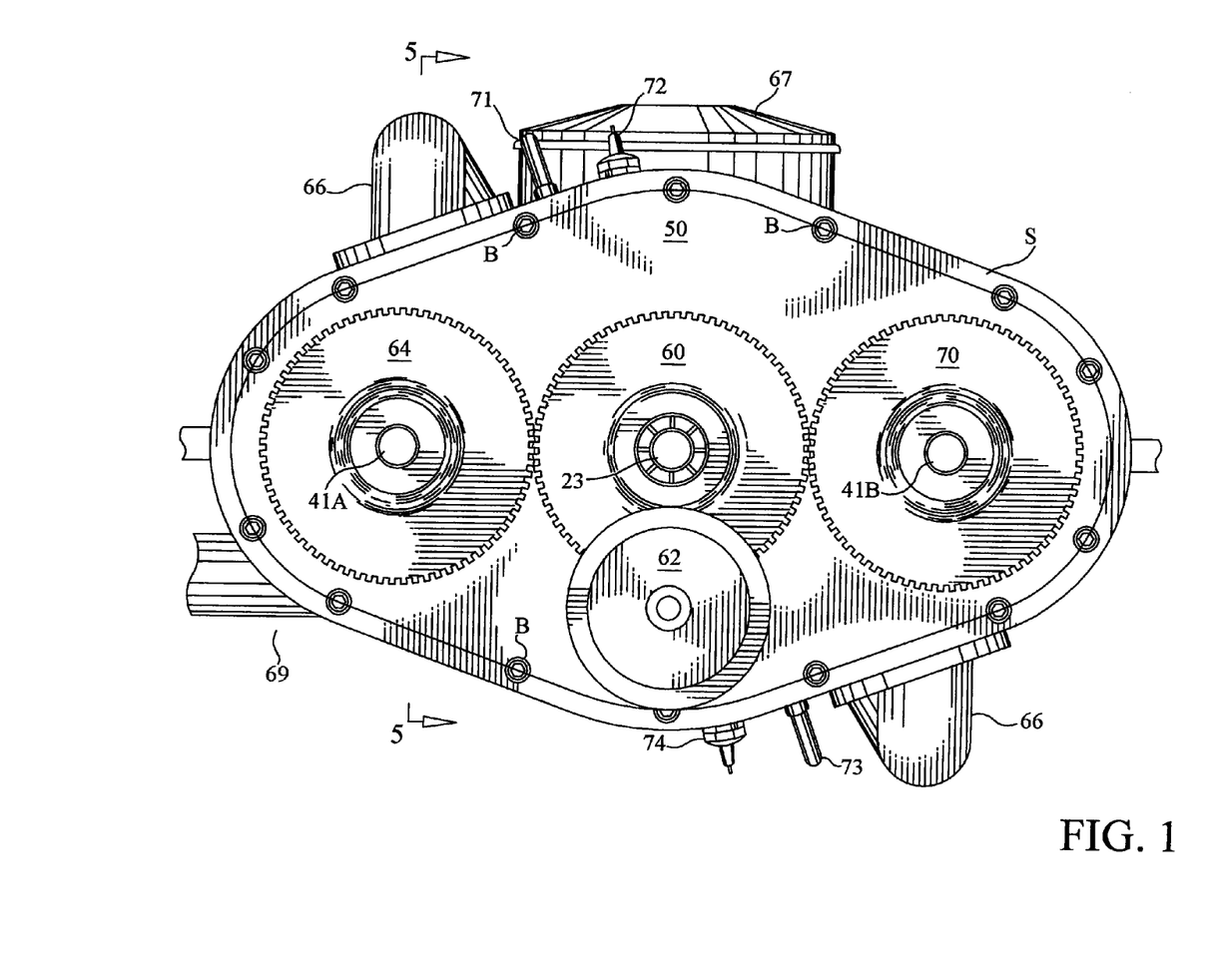
FIG. 1 is an elevation of one side of an engine in accordance with the present invention.
Figure 2:
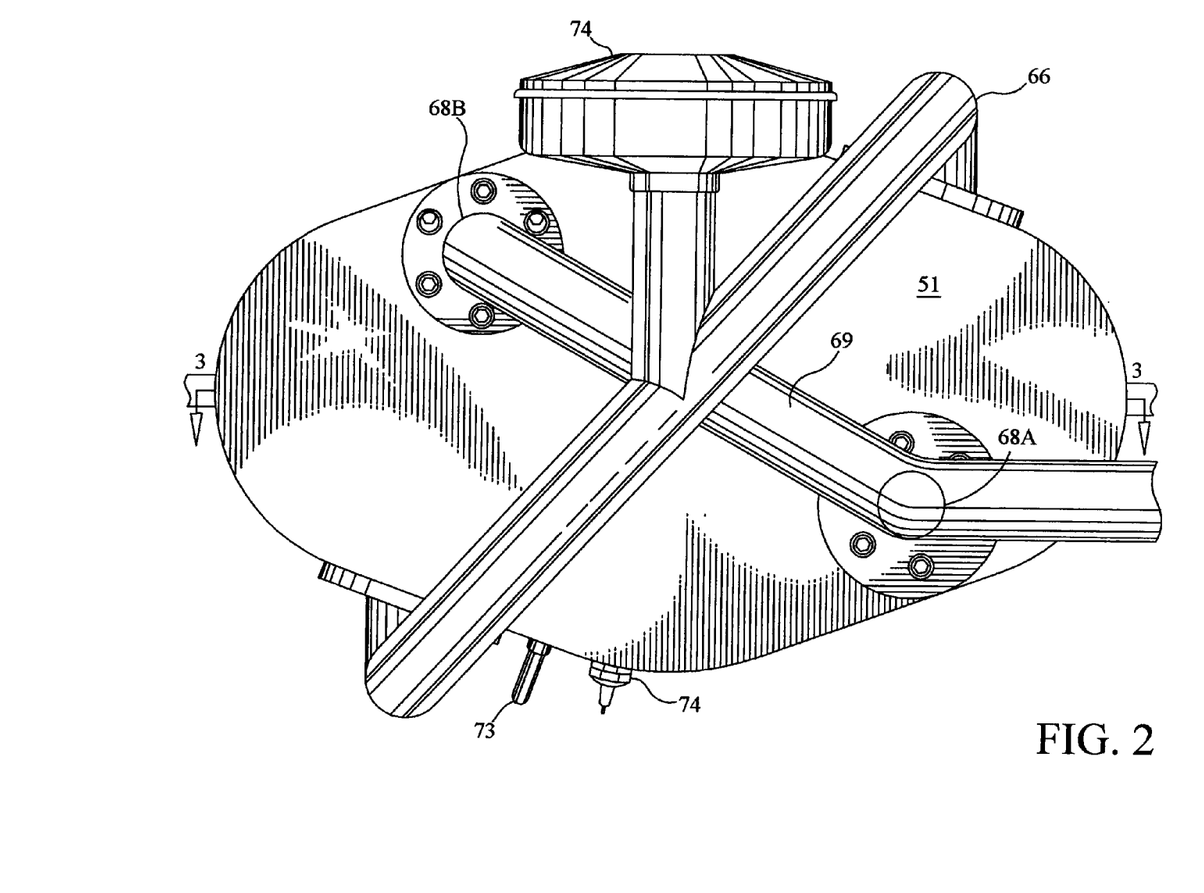
FIG. 2 is a similar view of the opposite side of the engine of FIG. 1.

With the central rotor 22 rotating clockwise and the, outer rotors 40A and 40B rotating counterclockwise in FIG. 2, vane 26 now moves into the peripheral recess 44A in outer rotor 40A and vane 27 moves into the peripheral recess 45B in outer rotor 40B. The lobe 43A on outer rotor 40A later uncovers the upper air intake port 65A and the lobe 42B on the other outer rotor 40B uncovers the lower air intake port 65B.

After vane 26 has moved past the air upper intake port 65A and vane 27 has moved past the lower air intake port 65B on the opposite side, drawing air into the two combustion chambers, as described, fuel is injected behind these vanes and later the fuel-air mixture is ignited, as described. The products of combustion are vented from the combustion chambers through the exhaust ports 68A and 68B. This completes one rotation of the central rotor 22 and both outer rotors 30A and 30B.

While the presently-preferred embodiment of this engine has been shown and described as having two outer rotors on diametrically opposite sides of the main rotor, a 1:1 ratio between the main rotor gear 60 and each of the outer rotor gears 64 and 70, and a 1:1 ratio between the diameter of the main gear at the bottom of its circumferential groove and the diameter of each outer gear at its circumferential lobes, it is to be understood that the invention may be embodied in other designs having different numbers of outer rotors and different gear ratios and corresponding diameter ratios, so long as the surface speed of each outer gear at its lobes is the same as the surface speed of the main rotor at the bottom of its circumferential groove. For example, the engine may have just one outer rotor, or it may have four, six, eight or more outer rotors at equal intervals circumferentially of the main rotor. The number of vanes on the main rotor is such that there is a vane extending out from the main rotor into each inter-lobe recess in each outer rotor with a clearance fit when that recess in the outer rotor registers with the circumferential groove in the main rotor.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A rotary internal combustion engine comprising:
    a housing having a cylindrical central chamber of a predetermined diameter and cylindrical outer chambers extending parallel to and intersecting said cylindrical central chamber at circumferentially spaced locations, said cylindrical outer chambers being of the same diameter as each other and smaller than said predetermined diameter of said cylindrical central chamber;
    a central rotor rotatable in said cylindrical central chamber and having an outer periphery with a continuous circumferential groove therein said central rotor having a predetermined diameter at the bottom of said continuous circumferential groove; the inside of said housing at said cylindrical central chamber and the outside of said central rotor at said continuous circumferential groove therein defining a toroidal space between them;
    vanes coupled to said central rotor to move in unison with said central rotor, said vanes each blocking said continuous circumferential groove at circumferentially spaced locations along the periphery of said the central rotor and extending out from the central rotor to the inside of said cylindrical central chamber to divide said toroidal space into segments extending in succession circumferentially of said central rotor;
    means for introducing fuel and air into each of said segments of said toroidal space during each rotation of the central rotor, means for igniting the fuel/air mixture in each of said segments of said toroidal space during each rotation of the central rotor, and means for passing the products of combustion from said segments of said toroidal space;

a plurality of outer rotors rotatable respectively in said cylindrical outer chambers, each of said plurality of outer rotors having a pair of circumferentially spaced lobes, each said lobe having a clearance fit with the inside of each of the corresponding cylindrical outer chambers, and a pair of peripheral recesses between said lobes, each said plurality of outer rotors having a diameter at said lobes substantially equal to said predetermined diameter of said central rotor at the bottom of said continuous circumferential groove therein, each said outer rotor having a clearance fit of said pair of circumferentially spaced lobes in said continuous circumferential groove in said central rotor when said central rotor rotates in one direction and said plurality of outer rotors rotate in an opposite direction, each of said pair of circumferentially spaced lobes completely blocking said means for introducing air during a respective predetermined part of each rotation of said outer rotor;

said vanes on said central rotor passing circumferentially through said pair of peripheral recesses in each said outer rotor when said central rotor rotates in one direction and said plurality of outer rotors rotate in the opposite direction, and means acting between said central rotor and said plurality of outer rotors to cause said plurality of outer rotors to rotate in the opposite direction from the central rotor, with the surface speed of said pairs of circumferentially spaced lobes equal to the surface speed of said central rotor at the bottom of said continuous circumferential groove.

2. The internal combustion engine according to claim 1, wherein said means for introducing fuel and air comprises fuel injectors which discharge fuel into said cylindrical central chamber at different locations circumferentially of said central rotor and a plurality of air intake ports which open respectively into said cylindrical outer chambers;

each one of said pairs of circumferentially spaced lobes periodically blocks said corresponding air intake port during rotation;

and each of said peripheral recesses between said lobes connects the corresponding air intake port to a corresponding one of said segments of said toroidal space between said housing at said cylindrical central chamber and the outside of said central rotor at said continuous circumferential groove therein when each of said peripheral recesses move past said air intake port.

3. The internal combustion engine according to claim 2, wherein:

said fuel injectors consist of a pair or fuel injectors which inject fuel into said cylindrical central chamber at diametrically opposite locations between said first and second cylindrical outer chambers;

and said intake ports consist of first and second intake ports which open respectively into said first and second cylindrical outer chambers.

4. The internal combustion engine according to claim 2 wherein during each rotation of said central rotor and said plurality of outer rotors in opposite directions, each of said peripheral recesses in each of said outer rotors moves past the corresponding air intake port a short time after the corresponding vane on the central rotor moves out of said peripheral recess whereby said vane creates a partial vacuum to draw air from said air intake port through said peripheral recess in the outer rotor into the corresponding segment of said toroidal space between said housing at said cylindrical central chamber and the outside of said central rotor at said continuous circumferential groove therein.

5. The internal combustion engine according to claim 4, wherein:

said cylindrical central chamber of said housing has a circumferential groove except at intersections with said outer cylinders, said circumferential groove in said cylindrical central chamber continuously registering with said continuous circumferential groove in said central rotor; and said vanes have a clearance fit in said continuous circumferential groove in said cylindrical central chamber of the housing.

6. The internal combustion engine according to claim 1, wherein:

said cylindrical central chamber of said housing has a circumferential groove except at intersections with said outer cylinders, said inside circumferential groove in said cylindrical central chamber continuously registering with said continuous circumferential groove in said central rotor; and said vanes have a clearance fit in said circumferential groove in said cylindrical central chamber or the housing.

7. The internal combustion engine according to claim 1, wherein:

said cylindrical outer chambers consist of first and second cylindrical outer chambers intersecting said cylindrical central chamber at diametrically opposite positions;

said vanes consist of two vanes coupled to said central rotor at diametrically opposite locations thereon;

and said plurality of outer rotors consist of first and second outer rotors rotatably received respectively in said first and second cylindrical outer chambers.

* * * * *